May 27, 1958 F. H. AINSWORTH 2,836,142
VISIBLE FLOW INDICATOR
Filed March 4, 1957 2 Sheets-Sheet 1
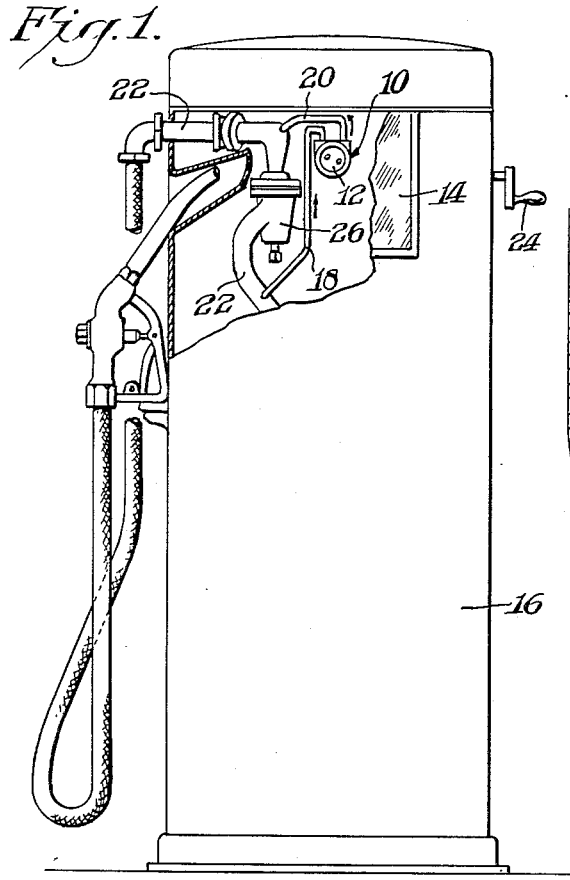
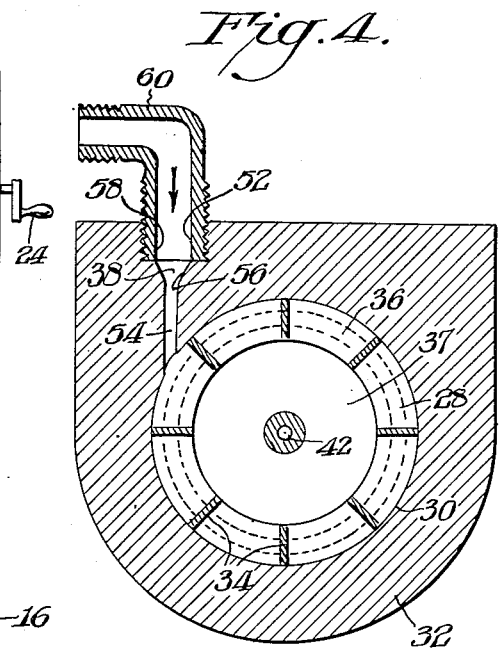
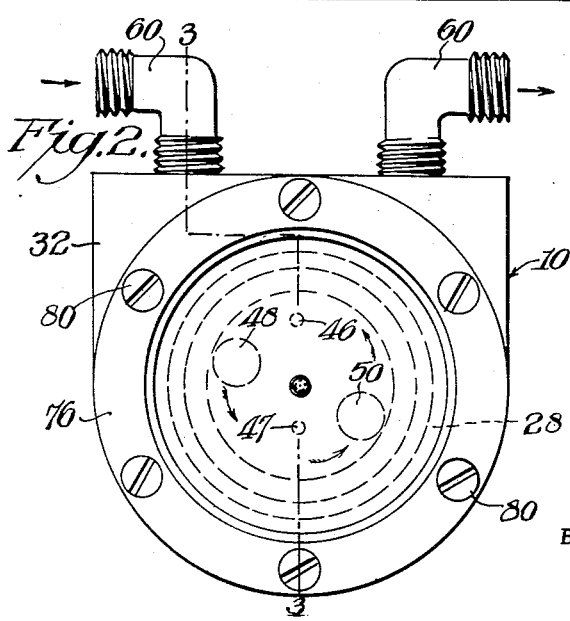
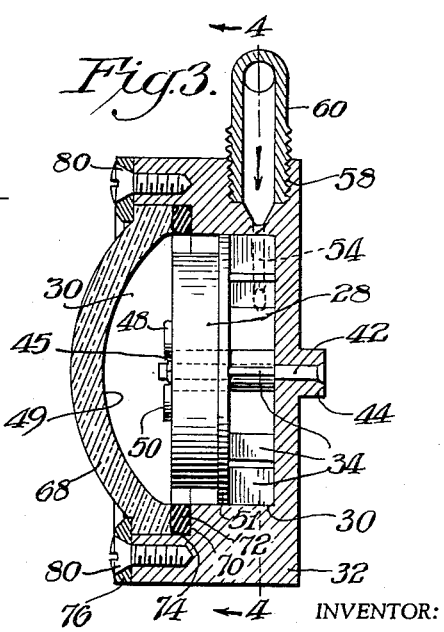
INVENTOR:
Freedom H. Ainsworth
BY
ATTORNEY May 27, 1958     F. H. AINSWORTH     2,836,142
VISIBLE FLOW INDICATOR
Filed March 4, 1957     2 Sheets-Sheet 2
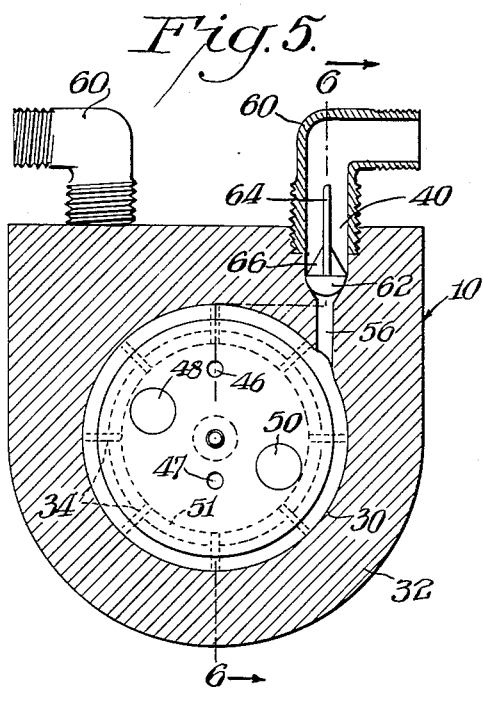
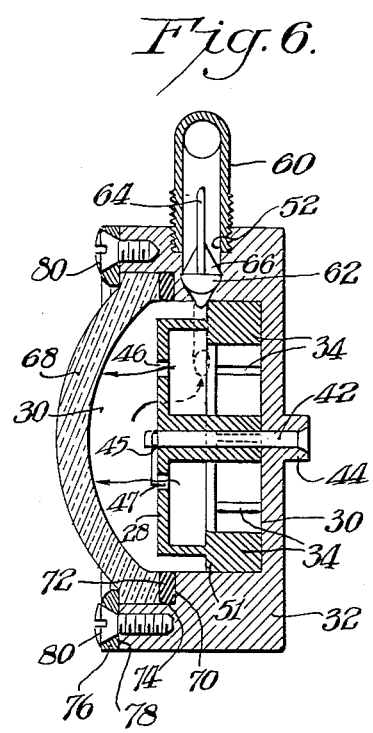
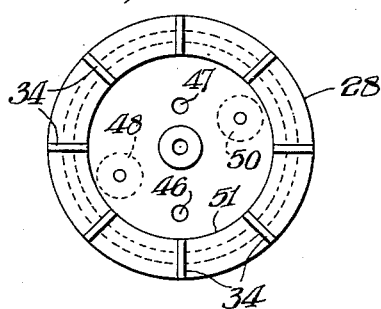
INVENTOR:
Freedom H. Ainsworth
BY T. Wallace Quinn
ATTORNEY United States Patent Office 2,836,142
Patented May 27, 1958

2,836,142

VISIBLE FLOW INDICATOR

Freedom H. Ainsworth, Salisbury, Md., assignor to The Wayne Pump Company, Salisbury, Md., a corporation of Maryland Application March 4, 1957, Serial No. 643,658

7 Claims. (Cl. 116—117)

This invention relates to a visible flow indicator used in conjunction with fluid dispensing apparatus, and more particularly relates to a visible flow indicator for use in conjunction with gasoline dispensing apparatus.

Visible flow indicators are commonly associated with gasoline dispensing apparatus to provide a visible indication of the character of gasoline flow and the presence of air while the meter is registering. This enables the operator and purchaser to conveniently ascertain whether a full flow of gasoline is being pumped while the meter is registering.

Heretofore, these indicators have been connected directly in the main piping system of the dispensing apparatus thereby introducing a considerable obstruction to flow into the system. Utilization of the full flow also restricts the freedom of placement of the indicator and makes its structure bulky and expensive. Furthemore, the large size of these indicators make them subject to stoppage under conditions of low flow rate.

An object of this invention is to provide a simple and inexpensive visible flow indicator for a fluid dispensing apparatus which may be placed at any convenient position upon or remote from the dispenser.

Another object is to provide an efficient visible indicator as aforementioned which need not accommodate the full flow of liquid passing through the dispensing apparatus and which is operative even under conditions of extremely low rate of flow.

In accordance with this invention, a visible flow indicator is mounted across a check valve in the piping system of the dispensing apparatus. This check valve provides a substantially constant pressure drop for consistently rotating the spinning element of the indicator. An auxiliary check valve is incorporated within the indicator to prevent back flow around the check valve incorporated in the main fluid dispensing system. The auxiliary check valve is constructed and arranged to close at lower rates of flow than that at which the main check valve closes. The main check valve, therefore, shuts first, and all of the flow at low rates goes through the indicator to provide a consistent rotational force for the spinning element of the indicator even at extremely low rates of flow.

An economical and durable spinning element may be made of a hollow bladed disc with inserts of contrasting colors imbedded in its visible surface. The face of the indicator may be scrubbed clean by jets of fluid which impinge on the inner surface of the sight glass from holes in the adjacent side of the spinning element. A flow of fluid through these holes is promoted by channeling the impelling flow of fluid into the hollow interior or cavity of the spinning element and discharging it from the space about the exterior of the spinning element.

Novel features and advantages of the present invention will become apparent to one skilled in the art from a reading of the following description in conjunction with the accompanying drawings wherein similar reference characters refer to similar parts and in which:

Fig. 1 is a view in elevation, partially broken away, showing an embodiment of this invention mounted upon a gasoline dispensing apparatus;

Fig. 2 is a detailed view in elevation of the embodiment of the invention shown in Fig. 1;

Fig. 3 is a cross-sectional view in elevation, taken through Fig. 2 along the line 3—3 and looking in the direction of the arrows;

Fig. 4 is a cross-sectional view in elevation, taken through Fig. 3 along the line 4—4, passing through the inlet chamber and looking in the direction of the arrows;

Fig. 5 is a cross-sectional view similar to Fig. 4 taken through the outlet chamber;

Fig. 6 is a cross-sectional view taken through Fig. 5 along the line 6—6 and looking in the direction of the arrows; and Fig. 7 is a rear view of a spinning element.

In Fig. 1, a flow indicator 10 is mounted with its face 12 visible behind the transparent panel 14 of a conventional gasoline dispensing apparatus 16. Since indicator 10 is connected by means of pipes or conduits 18 and 20 across a check valve 26 installed in the piping system 22 of apparatus 16, it may be positioned at any convenient location upon the apparatus 16. Its position behind transparent panel 14, for example, permits the purchaser to simultaneously observe the meter and character of gasoline flow. Indicator 10, however, may also be conveniently mounted, for example, adjacent reset lever 24 of apparatus 16 as well as in any other location upon the apparatus 16 or remote from it, which might be advantageous for any specific reason. Conduits or pipes 18 and 20 may be copper tubing, for example. Pipes 18 and 20 are connected, for example, to upper portions of the pipes included within system 22 in order to detect the presence of any air within the system which would pass through the upper portions of the pipes.

As shown in Fig. 1, indicator 10 is connected across a conventional check and pressure relief valve 26. Since a substantial pressure drop is provided by the flow of gasoline through valve 26, a dependable pressure differential is provided for rotating a spinning element within indicator 10 which is later described in detail in conjunction with Figs. 2–7. Indicator 10, therefore, includes a check valve of its own (later described in detail) to prevent bypassing of combination check and pressure relief valve 26. This check valve included in the indicator is designated as an auxiliary check valve to differentiate it from the main check valve in the system.

Figs. 2–7 show the details of indicator 10. A spinning element 28 is rotatably mounted within a chamber 30 cylindrically shaped, for example, within the body 32 of indicator 10. Spinning element 28 is a hollow bladed disc, for example, which is conveniently fabricated of a plastic composition, such as urea formaldehyde. Its blades 34 are constructed and arranged, for example, to lie perpendicular to the propelling flow of liquid. Passages 36 are provided between blades 34 for conducting incoming fluid into the hollow interior 37 of the element for a purpose later described in detail.

Body 32 is conveniently fabricated, for example, of a die cast metal. A zinc alloy, for example, provides an inexpensive and accurate structure. It includes an inlet chamber 38 and an outlet chamber 40 which are arranged respectively in line with the bladed aperture portion and the exterior of the spinning element. Spinning element 28 is mounted upon post 42 which is secured to body 32 within a boss 44. Locking ring 45, for example, axially secures element 28 upon post 42.

As shown in Fig. 6, holes 46 and 47 are drilled completely through the side of spinning element 28 adjacent the inside surface 49 of the indicator sight glass 68. A flow of gasoline passes through these holes and scrubs surface 49 to maintain it clear of dirt particles. Holes 46 and 47 are disposed at different radii to scrub additive arcuate portions of the face. Spinning element 28 also includes a raised circumferential ring 51, for example, to substantially seal the inlet portion of chamber 30 from the outlet portion. This provides a substantial pressure drop for impelling jets of fluid through holes 46 and 47.

A pair of inserts 48 and 50 of colors contrasting to each other and relative to the color of the main body of spinning element 28 are pressed within spinning element 28. A highly attractive and exceedingly clearly visible indicator is made, for example, of a clear transparent element 28 to which red and yellow inserts 48 and 50 are attached.

Chambers 38 and 40 each include, for example, a larger bore hole 52 extending into body 32 from without and a smaller bore hole 54 connecting hole 52 to cavity or inner chamber 30 within body 32. Holes 52 are connected to holes 54 by means of a tapered transition passage 56. The outer portions of holes 52 are internally threaded at 58 to provide means for securing conduits or pipe fittings, for example, screw type elbows 60.

Outlet chamber 40 includes a check valve element 62, a ball check for example. Ball check element 62 is conveniently fabricated of a plastic, such as urea formaldehyde, to which is attached a stem 64 and directional vanes 66. Stem 64 is made of steel wire, for example, and directional vanes 66 may be an integral molded part of the ball check element 62. Elements 64 and 66 maintain ball or auxiliary check 62 in an operative position adjacent transitional passage 56 within which it seats upon the initiation of backward flow. The auxiliary check valve element is not spring loaded or biased to close as is the main check valve 26. It, therefore, does not close until an actual reversal of flow is initiated which occurs after the main check valve 26 has already closed. The auxiliary check valve may be lightly spring biased to close, however, as long as it is arranged to shut after the main check has already closed.

The front of spinning element chamber 30 is closed by means of a transparent panel or sight glass 68 sealed against shoulder 70 encircling the entrance to cavity 30, for example, by means of an O-ring gasket 72 within a suitable recess 74. Sight glass 68 is maintained in firm contact against gasket 72 by means of a clamping ring 76 which is held firmly against facing 78 by cap screws 80. Sight glass 68 is made of a suitable transparent plastic, such as an acrylic resin, or any other wear and corrosion resistant transparent material, such as glass. It is shown lenticular in cross section to magnify the image of the spinning element, however, the lenticular shape may be eliminated, if desired, because the fluid surrounding the spinning element itself acts as a magnifier.

Operation

As gasoline flows through system 22, a substantial and consistent pressure drop is developed across combination pressure and relief valve 26. A substantial pressure differential is, therefore, developed between inlet chamber 38 and outlet chamber 40. This pressure differential promotes a substantial flow of liquid from inlet chamber 38 through passage 54 against the blades or paddles 34 of spinning element 28 which pass substantially perpendicular to the flow through pasage 54. This flow of gasoline thereby causes spinning element 28 to briskly rotate about post 42. Part of the incoming fluid flows through passages 36 between blades 34 into the hollow interior 37 of spinning element 28. It then flows in the form of jets through holes 46 and 47, and impinges on the adjacent surface 49 of sight glass 68 to maintain it free of obscuring dirt particles. The rotating movement of the brightly colored inserts clearly indicates to the operator and purchaser that gasoline is flowing as the meter is registering.

Since conduits 18 and 20 are attached to the upper portions of the pipes 22 of the main dispensing system, any air passing within the system will be channeled through the indicator and thereby exposed to the purchaser. A reliable indication of the state of the flow is thereby provided even though only a small portion of the entire flow of gasoline through the dispenser is channeled through the indicator. This small percentage of flow also makes the structure of the indicator far less bulky and expensive than one which must handle the entire flow through the dispensing apparatus. Indicator 10 may also be mounted at any other convenient position upon the dispensing apparatus 16 or even in locations remote from the dispenser such as upon an instrument panel which might be mounted, for example, directly in front of the purchaser's automobile window.

Ball or auxiliary check 62 within outlet chamber 40 prevents any back flow from bypassing combination check and pressure relief valve 26 through indicator 10. Stem 64 and directional vanes 66 incorporated in ball check element 62 maintain the check element in the vicinity of seat 56 to provide immediate closure of the check upon the initiation of back flow. Since auxiliary check valve element 62 shuts after the closure of main check valve 26 has occurred, all of the fluid at low rates of flow is channeled through the indicator. This provides consistent rotation of the indicator even at extremely low rates of flow.

What is claimed is:

1. A visible flow indicator for use in liquid dispensing apparatus comprising a casing having a chamber provided with an inlet and an outlet adapted for connection respectively to a conduit in the apparatus through which liquid to be dispensed is to be passed under pressure at points where during the normal dispensing operation the pressure is relatively higher and lower, said chamber having a transparent panel and visible means therein actuated by flow of liquid therethrough, said outlet having a check valve adapted to close upon initiation of backward flow of liquid through said chamber.

2. An indicator as set forth in claim 1 wherein said means is a spinning element rotatably mounted within said chamber and adapted to be rotated by flow of liquid therethrough.

3. An indicator as set forth in claim 2 wherein the spinning element is provided with blades and a hollow interior on its inner side and with a disc having an aperture communicating with said hollow interior on its outer side.

4. An indicator as set forth in claim 3 wherein the spinning element includes a circumferential ring which in cooperation with a circumferential side wall of said chamber substantially seals the inner side of said spinning element from its outer side except for the passage provided by said aperture.

5. An indicator as set forth in claim 3 wherein the disc has a plurality of apertures located at different radii.

6. In a liquid dispensing apparatus, having a conduit adapted for connection at one end to a source of liquid supply, means for forcing liquid through said conduit, and a nozzle at the other end of said conduit having a valve for controlling the rate of flow of liquid to be dispensed, a pressure relief valve located at a point intermediate the ends of said conduit, said valve opening in the normal direction of flow of liquid through the conduit, a flow indicator including a casing having a chamber provided with an inlet and an outlet respectively connected to said conduit at the high and low pressure sides of said valve, said chamber having a transparent wall and means therein actuated by flow of liquid therethrough, said outlet having a check valve adapted to close upon initiation of backward flow of liquid through said chamber.

7. In a liquid dispensing apparatus, having a conduit adapted for connection at one end to a source of liquid supply, means for forcing liquid through said conduit, and a nozzle at the other end of said conduit having a valve for controlling the rate of flow of liquid to be dispensed, a pressure relief valve located at a point intermediate the ends of said conduit, said valve opening in the normal direction of flow of liquid through the conduit, a flow indicator including a casing having a chamber provided with an inlet and an outlet respectively connected to said conduit on the high pressure and low pressure sides of said relief valve, said chamber having on one side a transparent wall, a spinning element mounted within said chamber, said element having blades on its inner portion and a disc on its outer portion, said blades being located in the path of flow of liquid through said chamber to cause spinning of said element, said outlet being provided with a check valve adapted to close upon initiation of backward flow of liquid through said chamber.

References Cited in the file of this patent

UNITED STATES PATENTS

| | | |
|---|---|---|
| 373,440 | Chapman | Nov. 22, 1887 |
| 2,097,535 | Rugel | Nov. 2, 1937 |
| 2,145,304 | Hill | Jan. 31, 1939 |
| 2,147,309 | Moore | Feb. 14, 1939 |
| 2,387,805 | Olsen | Oct. 30, 1945 |
| 2,678,624 | Grise | May 18, 1954 |